US005700439A

United States Patent [19]
Goyette et al.

[11] Patent Number: 5,700,439
[45] Date of Patent: Dec. 23, 1997

[54] METHOD OF REMOVING HYDROGEN SULFIDE FROM HOT GAS MIXTURES

[75] Inventors: William J. Goyette, Towson; Francis J. Keenan, Millersville, both of Md.

[73] Assignee: Chemetals Technology Incorporated, Wilmington, Del.

[21] Appl. No.: 659,966

[22] Filed: Jun. 7, 1996

[51] Int. Cl.$^6$ .............................. B01J 20/32; B01D 53/52
[52] U.S. Cl. .................. 423/230; 423/244.06; 423/274; 502/500
[58] Field of Search .................. 423/573.1, 567.1, 423/230, 244.06, 274; 502/500, 504

[56] References Cited

U.S. PATENT DOCUMENTS

| | | | |
|---|---|---|---|
| 2,979,384 | 4/1961 | Weiner et al. | 423/573.1 |
| 4,039,478 | 8/1977 | Cull et al. | 252/455 R |
| 4,225,417 | 9/1980 | Nelson | 208/89 |
| 4,857,296 | 8/1989 | Brunelle et al. | 423/574 R |
| 5,045,522 | 9/1991 | Kidd | 502/405 |

FOREIGN PATENT DOCUMENTS 1230466  12/1987  Canada.

OTHER PUBLICATIONS

Ben-Slimane, R. et al., "Desulfurization of Hot Coal-Derived Fuel Gases With Manganese-Based Regenerable Sorbents. 1. Loading (Sulfidation Tests)", *Energy & Fuels*, vol. 8, pp. 1175 to 1183 (1994). no month.

Grant and Hackh's Chemical Dictionary (1987 no month given) by McGraw-Hill Inc., 5th ed., U.S.A., p. 71.

*Primary Examiner*—Gary P. Straub
*Assistant Examiner*—Timothy C. Vanoy
*Attorney, Agent, or Firm*—Spencer & Frank

[57] ABSTRACT

Coated sulfur sorbent particles have been found to resist agglomeration when used in industrial processes generating sulfur vapors at elevated temperatures, even in the presence of hydrogen chloride and/or water vapor. These coated sulfur sorbents have been found to improve vapor phase sulfur sorption processes at elevated temperatures in either single or multiple sulfidation cycles followed by regeneration.

15 Claims, 2 Drawing Sheets

METHOD OF REMOVING HYDROGEN SULFIDE FROM HOT GAS MIXTURES

CROSS-REFERENCE TO RELATED APPLICATION

This application is related to our provisional application Ser. No. 60/000,026 filed Jun. 8, 1995, the specification of which is incorporated herein by reference.

FIELD OF THE INVENTION

The invention relates to coated compositions useful as vapor phase sulfur sorbents, for example, in hydrocarbon refining processes.

TECHNOLOGY REVIEW

The formation of hydrogen sulfide accompanies many industrial processes, such as pyrolysis, cracking, and hydrocracking processes. In hydrocarbon refining processes, hydrogen sulfide is usually produced in a mixture with hydrogen, methane and hydrocarbons. After the hydrogen sulfide is removed, the remaining gases can be used as a source of petrochemicals or as fuels.

Manganese-based sorbents for the removal of sulfur compounds at high temperatures are described in U.S. Pat. No. 4,225,417 to Nelson, Canadian Patent 1,230,466 to Furmisky, and an article entitled "Desulfurization of Hot Coal-Derived Fuel Gases With Manganese-Based Regenerable Sorbents. 1. Loading (Sulfidation) Tests" by R. Ben-Slimane et al., Energy & Fuels, Volume 8, pages 1175 to 1183 (1994), each of which is incorporated herein by reference. These sorbents are regenerable under appropriate conditions to allow multiple sulfidation cycles. Materials of this type, sold by Chemetals Incorporated of Baltimore, Maryland, U.S.A. are useful for the removal of such sulfur compounds.

Nevertheless, it has been found that on occasion higher than customary concentrations of sulfur compounds such as hydrogen sulfide, as well as hydrogen chloride, water and other vapors may enter the sorbent guard beds and result in some agglomeration of the sorbent particles. When agglomeration occurs the efficacy of the sorbent guard bed is reduced, and the industrial process must be stopped to permit removal of the agglomerated material from the reactor and replacement with fresh sorbent materials, resulting in increased time and costs.

Therefore there exists a need to provide sulfur scavenger compositions which resist water and other vapors while maintaining good sulfur sorption. There also exists a need to provide sulfur scavenger compositions which resist agglomeration. Finally, there exists a need to improve the performance of vapor phase sulfur sorption processes.

SUMMARY OF THE INVENTION

It has now been found that when sulfur sorbent particles are coated with a relatively thin coating of an appropriately inert substance, the coated compositions resist water and other vapors while maintaining good sulfur sorption. The coated particles also resist agglomeration, even in the presence of hydrogen chloride or water vapor. It has also been found that these coated compositions improve the performance of vapor phase sulfur sorption process.

DETAILED DESCRIPTION OF THE INVENTION

The four stable oxides of manganese: MnO, $Mn_3O_4$, $Mn_2O_3$, and $MnO_2$ were tested as sulfur sorbents by Ben-Slimane, supra. Of these, MnO has been found to be especially effective as a sulfur sorbent over a wide temperature range. Nevertheless, the disadvantages of uncoated sulfur sorbents noted above have been observed.

EXAMPLES

To illustrate these disadvantages, and the surprising advantage of a coated sorbent according to the present invention, a series of experiments were performed. In the first experiment, MnO prills were exposed to an atmosphere comprising 1 percent hydrogen sulfide and 99 percent hydrogen at a temperature of 375° C. for 26 days. A second experiment was run employing MnO spheres, with and without an alumina coating. Instead of the hydrogen sulfide/hydrogen atmosphere, the MnO spheres were also exposed to an atmosphere comprising 23 percent hydrogen chloride, 1 percent hydrogen sulfide and 76 percent hydrogen at a temperature of 375° C. for a 25 day period.

It was observed that, at the conclusion of these experiments, the uncoated beds of spheres were significantly agglomerated, whereas the coated MnO sorbent was free-flowing.

| | CHEMICALLY INDUCED AGGLOMERATION | | | |
|---|---|---|---|---|
| | $H_2S/H_2$ | | $HCl/H_2S/H_2$ | |
| Scavenger Type | Agglomeration | Wt % S | Agglomeration | Wt % S |
| MnO Prills | Med–High | 28.3 | — | |
| MnO Spheres | Low–Med | 29.0 | High | 23.1 |
| $Al_2O_3$ Coated MnO Spheres | None | 33.5 | None | 27.3 |

Figure 1:
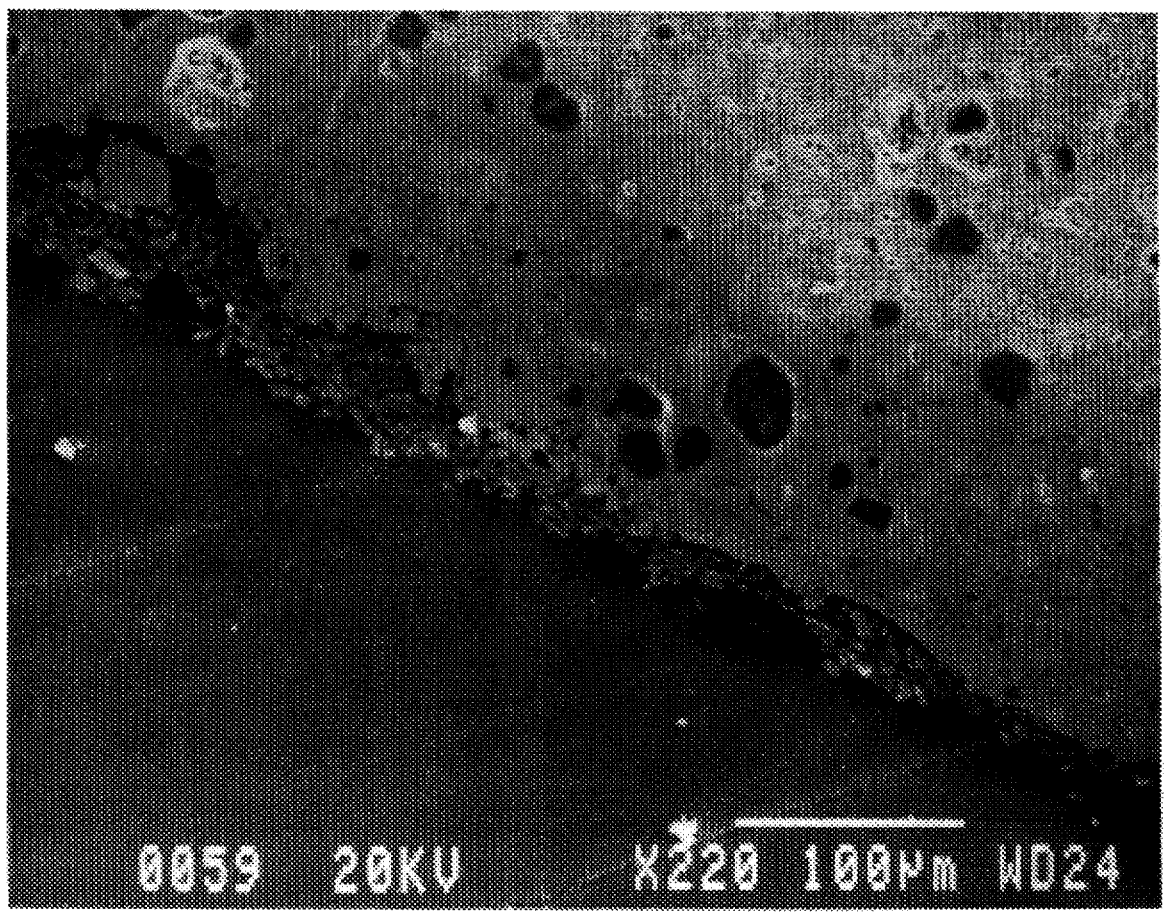
FIG. 1 is a scanning electron micrograph (SEM) at a magnification of 220.
Figure 2:
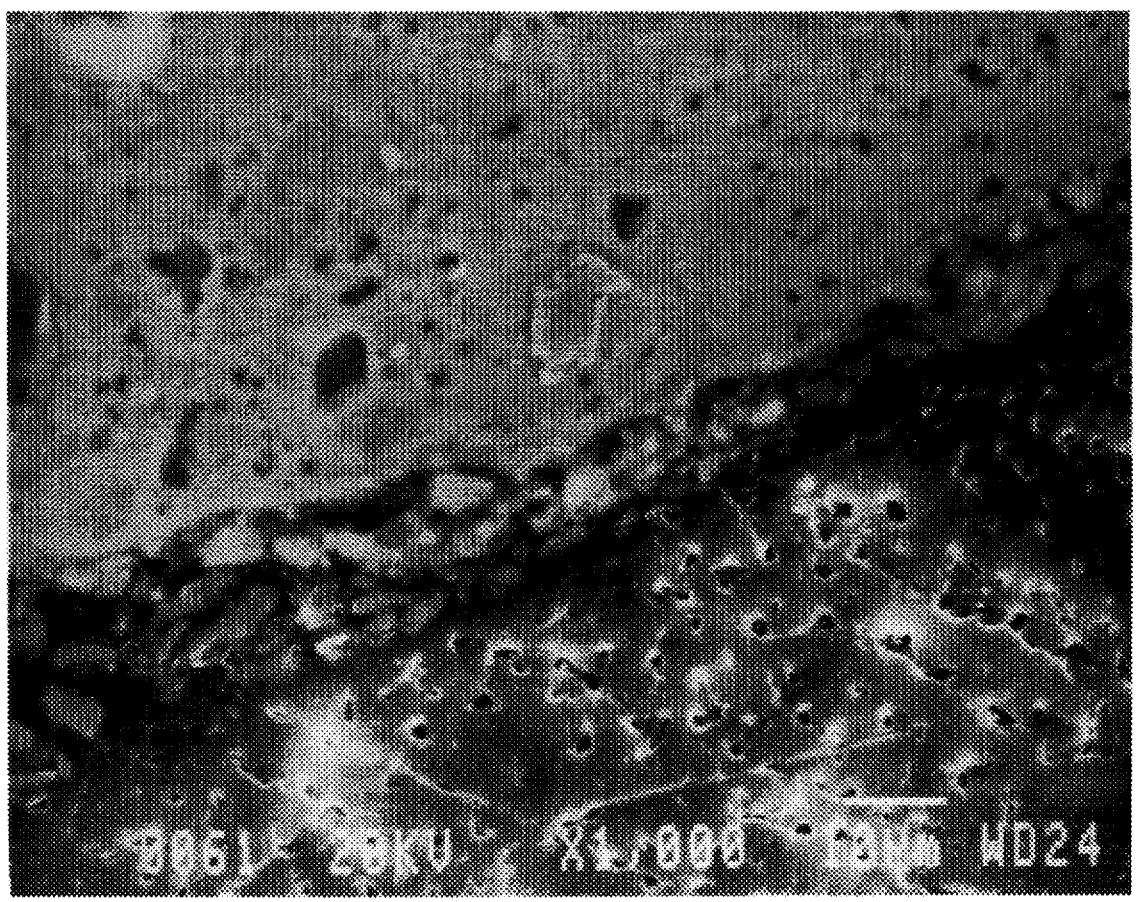
FIG. 2 is a SEM at a magnification of 1,000 of a cross-section of an MnO particle coated with alumina according to the present invention. These microphotographs were taken of imbedded MnO prill cross-sections and clearly illustrate the alumina particles which are located at the MnO prill's circumference. The alumina particles have an average coating thickness between about 9 and 10 microns.

The alumina coating employed in the above examples was prepared from fine particles of alumina, sold as Alcan FRF80. The thin alumina coating was applied to the MnO spheres by moistening the spheres with a 10 weight percent formic acid aqueous solution using a prill drum. The alumina coating of the coated sorbent was found to be between about 9 and 10 microns thick, measured by SEM (scanning electron microscope). A cross-section of a coated particle is illustrated in FIG. 1 which is a scanning electron micrograph at a magnification of 220.

Surprisingly, it has been found that the alumina coating does not interfere with the MnO sulfur sorbent's ability to sorb sulfur, but rather actually increases the sulfur uptake of the MnO. As will be observed from the Table, the coated sorbent took up ⅙ more sulfur compared to the uncoated MnO spheres, under the same conditions.

While not wishing to limit the scope of the invention by proposing a theoretical mechanism for the observed improvement, it appears possible that during the sulfur sorption process, at elevated temperatures, chemical bonds may form between the manganese and vapors including either sulfur or chlorine. If such bonds are formed, crystals of manganese sulfide or manganese chloride can form and bridge between adjacent particles to block access to the particle surface. The coating of the present invention may, perhaps, interfere with the interactions between neighboring manganese oxide particles in a sorbent bed. Assuming this mechanism is correct, the coating need not be very thick to disrupt the bridging process. It has been found that coatings from about 5 to 20 microns, preferably from 7 to 15 microns, and most preferably about 9 to 10 microns are useful in the practice of the present invention. The use of thicker coatings is not recommended, since the coating may decrease the available surface area of the sorbent particles. The use of thinner coatings is also not recommended, since such thin coatings may be unable to effectively disrupt the bridging process, resulting in agglomeration.

Although the coating used in the above example is alumina, the present invention is not limited to alumina coatings. The coating material may be any compound which is substantially inert to both the sulfur sorbent and the gaseous atmosphere to which the coated particles are exposed. By substantially inert we mean that no observable reaction takes place between the coating material and either the sulfur sorbent or the vapors of the gaseous atmosphere. Suitable coatings in addition to alumina include silica, bentonite and cerium oxide.

The present invention is also not limited to the use of manganese oxide sorbents, and may include any other vapor phase sulfur sorbent, including for example zinc oxide, nickel oxide, and iron oxide. In general, the sulfur sorbent may be an oxide, aluminate, titanate, or ferrite of manganese, zinc, nickel, or iron.

As those of ordinary skill in this technology will realize, the present invention is not limited to the description or examples given above, but includes all obvious variations which would be apparent to those of ordinary skill in this technology.

What is claimed is:

1. In a hydrocarbon refining process wherein vapor phase sulfide compounds are scavenged by a solid sorbent selected from the group consisting of oxides, aluminates, titanates, and ferrites of manganese, zinc, nickel, iron and mixtures thereof, the improvement comprising retarding sorbent agglomeration by externally coating said solid sorbent with a coating which does not interfere with the sorbent's ability to sorb, said coating from 5 to 20 microns of a substance inert to both sorbent and vapor phase sulfide compounds selected from the group consisting of alumina, silica, bentonite, and cerium oxide.

2. The process as set forth in claim 1, wherein said sulfide sorbent is selected from the group consisting of manganese oxide, zinc oxide, nickel oxide, and iron oxide.

3. The process as set forth in claim 1, wherein said sulfide sorbent is MnO.

4. The process as set forth in claim 1, wherein said coating material is alumina.

5. The process as set forth in claim 1, wherein said coating material is silica.

6. The process as set forth in claim 1, wherein said coating material is cerium oxide.

7. The process as set forth in claim 1, including regenerating said coated vapor phase sulfur sorbent and removing additional sulfur vapors.

8. The process as set forth in claim 1, wherein said vapor phase sulfide compound is hydrogen sulfide.

9. The process as set forth in claim 1, wherein said coating material is bentonite.

10. The process as set forth in claim 9, wherein said sulfide sorbent is MnO.

11. In an industrial process wherein vapor phase sulfide compounds are scavenged by a solid sorbent selected from the group consisting of oxides, aluminates, titanates, and ferrites of manganese, zinc, nickel, iron and mixtures thereof, the improvement comprising retarding sorbent agglomeration by externally coating said solid sorbent with a coating which does not interfere with the sorbent's ability to sorb, said coating from 5 to 20 microns of a substance inert to both sorbent and vapor phase sulfide compounds selected from the group consisting of alumina, silica and bentonite.

12. The process as set forth in claim 11, wherein said sulfide sorbent is selected from the group consisting of manganese oxide, zinc oxide, nickel oxide, and iron oxide.

13. The process as set forth in claim 11, wherein said coating material is alumina.

14. The process as set forth in claim 11, wherein said coating material is silica.

15. The process as set forth in claim 11, wherein said coating material is bentonite.

* * * * *

UNITED STATES PATENT AND TRADEMARK OFFICE
CERTIFICATE OF CORRECTION

PATENT NO.: 5,700,439
DATED : December 23, 1997
INVENTOR(S): William J. GOYETTE
Francis J. KEENAN It is certified that error appears in the above-identified patent and that said Letters Patent is hereby corrected as shown below:

On title page,
Between Items [22] and [51] insert:

-- Related U.S. Application Data

Provisional Application Serial No. 60,000,026 of June 8, 1995.--

Signed and Sealed this

Sixteenth Day of June, 1998

*Attest:*

BRUCE LEHMAN

*Attesting Officer*     *Commissioner of Patents and Trademarks*